(No Model.)  
2 Sheets—Sheet 1.

J. L. RODERICK.
Potato Digger.

No. 231,101.  
Patented Aug. 10, 1880.

Witnesses  
Geo. H. Strong.  
Frank A. Brooks

Inventor  
Joseph L. Roderick  
By Dewey & Co. Attys (No Model.) 2 Sheets—Sheet 2.

J. L. RODERICK.
Potato Digger.

No. 231,101. Patented Aug. 10, 1880.

Witnesses:
J. Walter Fowler,
R. K. Evans

Inventor:
Jos. L. Roderick
by A. H. Evans & Co
Att'ys

UNITED STATES PATENT OFFICE.

JOSEPH L. RODERICK, OF PETALUMA, CALIFORNIA.

POTATO-DIGGER.

SPECIFICATION forming part of Letters Patent No. 231,101, dated August 10, 1880.

Application filed April 17, 1880. (No model.)

*To all whom it may concern:*

Be it known that I, JOSEPH L. RODERICK, of Petaluma, county of Sonoma, and State of California, have invented an Improved Potato-Digger; and I hereby declare the following to be a full, clear, and exact description thereof.

My invention relates to certain improvements in potato-diggers; and my improvements consist in providing a rotating wheel provided with diggers or hooks, which take the potatoes from the ground and elevate them to an inclosed double screen, where they are automatically sorted, the small potatoes going into one receptacle and the larger ones into another, the dirt and lumps being separated by the peculiar construction of the wheel.

It further consists in a means of removing and discharging the weeds, tops, &c., from the machine, and in a method of attaching the sacks to the apparatus, so that they are filled with the sized potatoes as rapidly as said potatoes are dug.

It also consists in certain details of construction, as is more fully described in the accompanying drawings, in which—

Figure 1:
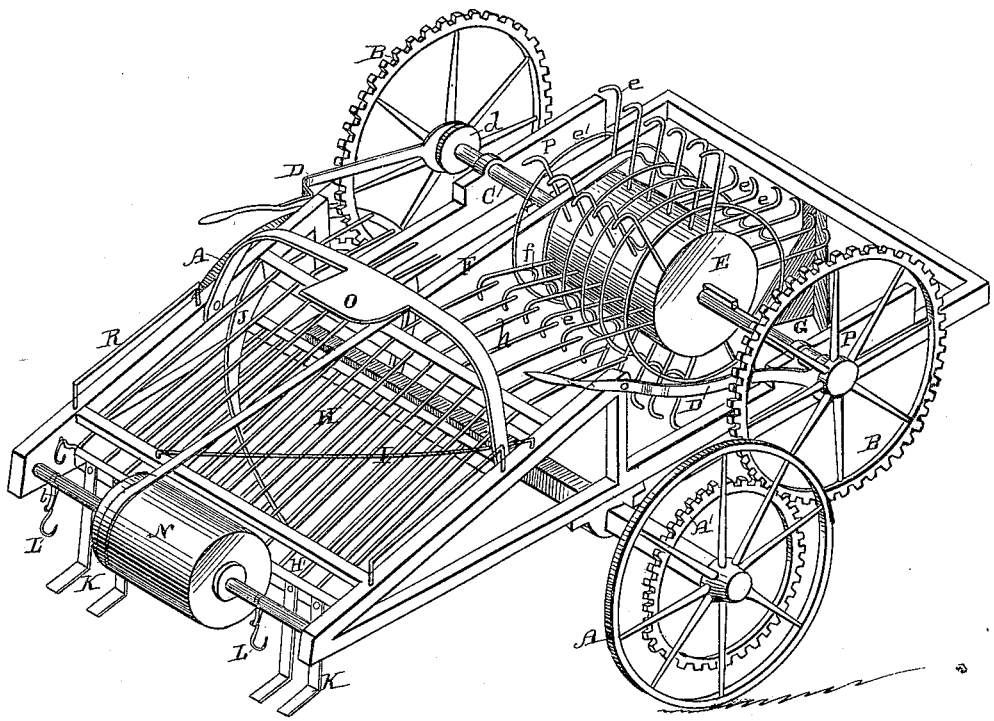
Figure 2:
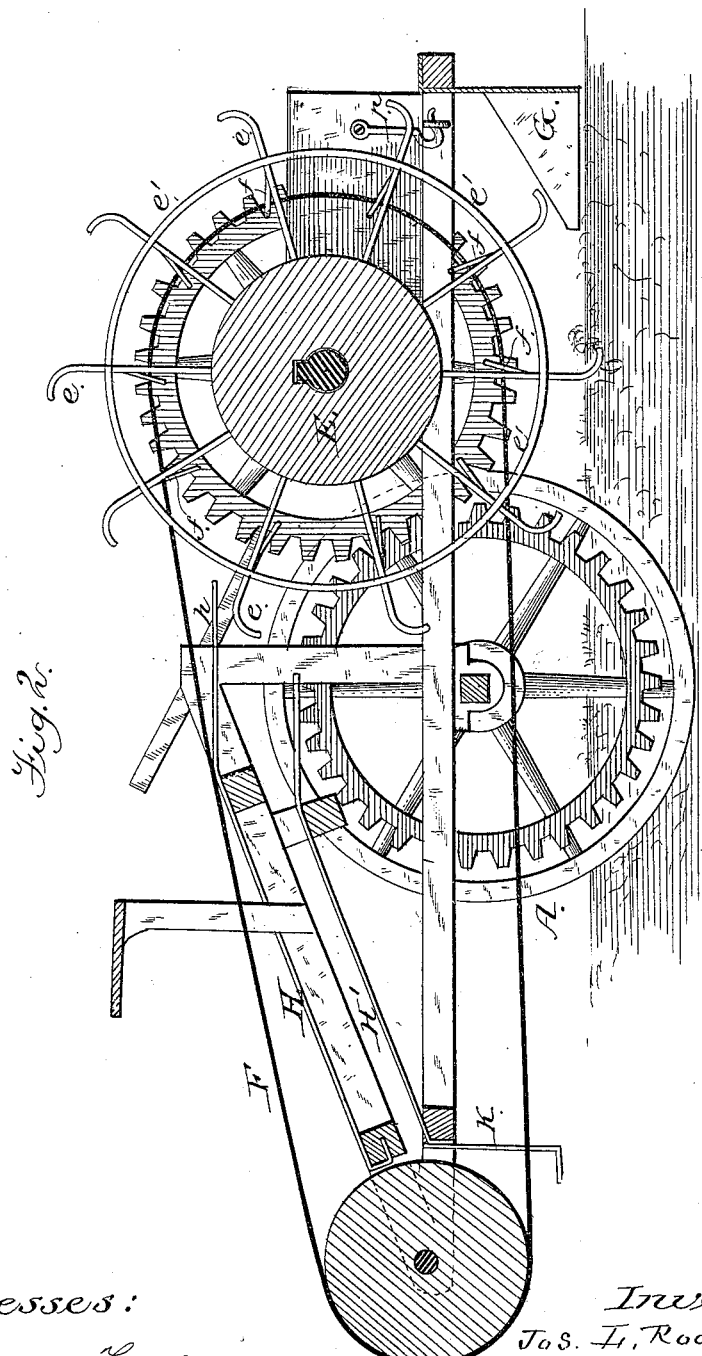

Figure 1 is a perspective view of my invention, the wheels straddling the potato-row and running in the furrows. Fig. 2 is a longitudinal vertical section of the same.

The frame of the apparatus is mounted on suitable wheels A, provided with spur-wheels A', which mesh with the gears B on the shaft C, as shown. Clutches *d*, having levers D, are provided to throw these gears B out of gear in turning corners or when the machine is going to or from the field.

On the shaft C is a peculiarly-formed wheel, E, having forked or curved diggers *e* and encircling bands or rods *e'*, the whole being made of rods or wires, like a skeleton-wheel, as shown. Between each of the spokes or diggers, below the bands *e'*, are curved bars *f*, around which the belts F travel for carrying off the weeds, as hereinafter described. In front of this wheel, below the cross-bar, is a spreader, G, which serves the purpose of pushing aside the weeds and grass before reaching the digging-wheel. Behind the digging-wheel, and set on an incline, are two screens, H H', one above another, the tines or teeth *h* of which project enough to pass between the forks or diggers *e*, as shown.

On the upper screen is a diagonal or curved bar or separator, I, for directing the potatoes to the rear left-hand corner; and on the under screen is a correspondingly-shaped bar, J, which directs the smaller potatoes to the rear right-hand corner, as shown. A guard, R, prevents the potatoes falling off the screen at the side.

On the bar forming the rear support of the lower screen are the sack-supporters K, and above these on the screen-frames are the sack-hooks L, hanging on the elastic bands *l*. The sacks for holding the sized potatoes rest on the supports K, and the hooks are hooked into the corners of the mouths of the sacks to hold them open properly, the elastic bands giving more or less, so the sacks will not be torn. Behind the screen is a pulley or band-wheel, N, around which the weed-belts F travel. The driver's seat O is above the screens, as shown.

The journal-boxes P, carrying the digging-wheel and axle C, are removable at will, being held in place by the hooks *p*. The whole wheels and gears may be taken out when desired.

As the apparatus is drawn over the ground by the team the gears revolve the skeleton-wheel E, which, by means of its curved fingers or diggers *e*, lifts up the potatoes and deposits them on the screen. The larger ones are directed by the band or separator I into the left-hand sack. The smaller ones, falling through the upper screen, are caught by the lower screen, and the band or separator J directs them into the sack at the right-hand corner, the potatoes being thus sized as dug.

As the wheel E revolves the belts F continue to travel on the bars *f*, and the weeds which are lifted are deposited on these belts, which carry them along over the screens and drop them on the ground over and behind the pulley N, the weeds being separated from the potatoes without danger of clogging the skeleton-wheel on the screens.

The clods and dust or earth mixed with the weeds and potatoes are separated by the peculiar form of the wheel E, dropping through the bands *e'* to the ground. These bands *e'* support the potatoes as they are dropped onto them by the fingers, and before said fingers reach the tines of the screen the belts take the weeds from the potatoes and carry them away, leaving the potatoes to drop by themselves onto the screen.

The fingers e of the skeleton-wheel E are not set exactly in line; but in passing between any two of the screen-tines h one goes near the right-hand tooth or tine and the following finger goes near the left-hand tine of the space, the object being to deposit the potatoes on the screen without any chance of dropping any, and in case a lump of dirt catches between the tines the fingers will loosen it and it will fall to the ground.

This apparatus will dig the potatoes from the ground, size or sort them, and sack them, all at one operation, throwing back the dust and dirt and separating the weeds. This is all done automatically, as described.

Having thus described my invention, what I claim as new, and desire to secure by Letters Patent, is—

1. In a potato-digger, in combination with the rotating wheel E, with its curved fingers or diggers e and the separating-bars e', the double-inclined screens H H', with projecting tines h, and having separating-bars I J, whereby the potatoes are elevated, separated, and sized, substantially as herein described.

2. In combination with the digging-wheel E, with its curved fingers e, bands e', and curved bars f, and the double screens H H', with their sizing devices, as shown, the belts F passing through said wheel and the pulley N and between the digging-fingers, whereby the weeds are separated from the potatoes, substantially as herein described.

3. In a potato-digging machine provided with a digging-wheel for lifting the potatoes onto the inclined screens H H', the oppositely-placed diagonal separating-bars I J, whereby the potatoes are sized and sorted, substantially as and for the purpose herein described.

In witness whereof I have hereunto set my hand.

J. L. RODERICK.

Witnesses:
FRANK A. BROOKS,
S. H. NOURSE.